United States Patent [19]

Collyer et al.

[11] Patent Number: 5,284,890
[45] Date of Patent: Feb. 8, 1994

[54] SYNTHETIC RUBBER COMPOSITION

[75] Inventors: John C. Collyer, Nepean; John R. Clark, Kanata, both of Canada

[73] Assignee: Her Majesty the Queen as represented by the Minister of National Defence of Her Majesty's Canadian Government, Ontario, Canada

[21] Appl. No.: 716,543

[22] Filed: Jan. 31, 1985

[51] Int. Cl.$^5$ .............................. C08L 15/02
[52] U.S. Cl. ............................ 524/203; 524/202; 524/314; 524/489; 524/551; 524/552; 524/574
[58] Field of Search .................... 424/83; 523/121; 524/202, 203, 574, 314, 488, 551, 552

[56] References Cited

U.S. PATENT DOCUMENTS

| | | | |
|---|---|---|---|
| 2,958,675 | 11/1960 | Hakala et al. | 524/202 |
| 3,534,123 | 10/1970 | Bostock et al. | 524/202 |
| 3,896,963 | 7/1975 | Schisler | 220/461 |
| 4,048,261 | 9/1977 | Starmer | 525/187 |
| 4,098,670 | 7/1978 | Custer et al. | 204/242 |
| 4,159,363 | 6/1979 | Elmer et al. | 428/295 |
| 4,218,779 | 8/1980 | Hart et al. | 2/168 |
| 4,256,858 | 3/1981 | Behr | 525/279 |
| 4,482,681 | 11/1984 | Berta et al. | 525/349 |
| 4,486,562 | 12/1984 | Fischer et al. | 524/552 |

*Primary Examiner*—Edward A. Miller
*Attorney, Agent, or Firm*—Nixon & Vanderhye

[57] ABSTRACT

The invention disclosed relates to an injection mouldable synthetic rubber composition which provides twenty-four hour protection from penetration by H-agent and as such is particularly suitable for use in gas masks. The novel rubber composition comprises a synthetic rubber such as bromobutyl rubber, carbon black and other appropriate additives.

4 Claims, No Drawings

SYNTHETIC RUBBER COMPOSITION

This invention relates to rubber compositions, and in particular to synthetic rubber compositions for use in gas masks.

Natural rubber has been the choice of rubber chemists for gas mask facepieces since the introduction of respiratory protecting gas masks towards the end of World War I. It has many advantages over synthetic elastomers for facepiece use including comfort, high resiliency, high strength, easy processing and moulding, non-dermatitic properties and good low temperature flexibility. However as protective equipment develops and improves, the materials they are made from require an ever increasing performance. With the advent of new mask designs some of the properties of the rubber require improvement, particularly in the areas of CW agent resistance, ozone resistance and stress-cracking resistance. With this in mind, applicant has concentrated on providing an improved rubber composition for facepiece use that would exhibit such improved properties. Various synthetic rubbers were evaluated along with blends with natural rubber. The material studies were based upon the knowledge that when the final material was chosen it would be susceptible to the present commercial injection moulding operation now used in industry.

The basic property which influences the polymer selection is its impermeability to chemical warfare (CW) agents, specifically H and GB agents. The standard selected for comparison was twenty-four (24) hour protection against H-agent (dichlorodiethyl sulphide). This standard is accepted by many countries.

According to the invention, applicant has now developed a novel injection mouldable synthetic rubber composition, which provides twenty-four hour protection from penetration by H-agent, comprising 100: a synthetic rubber material selected from the group consisting of bromobutyl rubber, chlorobutyl rubber, and blends of bromobutyl rubber with natural rubber;
20–55: carbon black;
0–1: a fatty acid cure promoter;
0–10: a paraffinic plasticizer;
0–10: an ester plasticizer;
0–2: an antioxidant;
0–2: a microcrystalline wax;
0.25–5: a rubber accelerator;
3–5: a metal oxide curing agent; and
0–0.75: a cure retarder, wherein all proportions are expressed in parts by weight per one hundred parts of rubber (pph).

The carbon black component is present in the various formulations in different particle size distributions based upon ASTM designations. Mixtures of the various carbon blacks have also been described. Useful carbon blacks include Sterling® SO (N550), Vulcan® 6 (N220), Regal® 300 (N326), Degausa® (S300), Sterling® S (N770), P33 ((N880), and Micronex® (S301). Most of our compositions include (N550) and mixtures of (N550) and (N220).

The first character in the nomenclature system for rubber-grade carbon blacks is a letter designating the cure rate. The letter "N" is used for the normal cure rate of furnace blacks and "S" for the slower cure rate associated with channel blacks. Any black having the cure rate of channel black is identified by the letter "S" for slow cure rate. Blacks may vary considerably in cure rate within each of the two letter classifications.

The second character in the system is a digit to designate the typical average particle size of the carbon black as determined by electron microscope measurement. The particle size range of rubber-grade carbon blacks has been divided into 10 arbitrary groups, each group has been assigned a digit 0 through 9 to describe that group. These groups are as follows:

| Group No. | Typical Average Particle Size. nm |
|---|---|
| 0 | 1 to 10 |
| 1 | 11 to 19 |
| 2 | 20 to 25 |
| 3 | 26 to 30 |
| 4 | 31 to 39 |
| 5 | 40 to 48 |
| 6 | 49 to 60 |
| 7 | 61 to 100 |
| 8 | 101 to 200 |
| 9 | 201 to 500 |

The third and fourth characters in this system are arbitrarily assigned digits.

The fatty acid cure promoter employed is preferably stearic acid, although other fatty acid cure promoters could also be employed, such as Octoate ® Z, a trademark for a mixed fatty acid cure promoter.

The paraffinic plasticizer used in most cases is Paraflex ®, a trademark for a series of petroleum based plasticizers for natural and synthetic rubbers.

Others such as Circosol ®, a trademark for various grades of naphthenic oils and Circo Light Oil have also been employed.

Various ester plasticizers have been employed; including dibutylsebacate (DBS), Kodaflex ® TX-1B, dicapryl phthalate, dioctyl phthalate (DOP), and dioctylazelate (DOA). The first three have been found to be equally applicable.

The antioxidant employed is preferably nickel dibutyldithiocarbamate (NBC), although others such as Naugawhite powder, a trademark for an alkylated phenol; and Agerite White, a trademark for sym-Di-beta-naphthyl-p-phenylenediamine.

The microcrystalline wax employed is preferably Sunproof ® Canadian, although Sunproof ® Improved has also been employed.

The metal oxide curing agent employed is zinc oxide. Other curing agents such as lead oxide ($Pb_3O_4$) could also be employed.

The rubber accelerator is preferably Methazate, a trademark for zinc dimethyldithiocarbamate. Ethyl zimate (zinc diethyldithiocarbamate) and Amberol have also been employed.

The preferred cure retarder employed is Maglite D, a trademark for light magnesium oxide.

Preliminary comparisons were made between various synthetic rubber formulations and a natural rubber control mix. The results shown in Table I below indicate that the chloro- and bromo-butyl elastomers all give twenty-four hour protection against H-agent.

TABLE I

| Comparison of Various Facepiece Rubbers | | | |
|---|---|---|---|
| Elastomer | NR | CIIR | BIIR |
| DREO Ident. | FP390 | FP321 | FP398A |
| Hardness Shore $A_2$ | 38 | 40 | 31 |
| 100% Modulus MPa (psi) | 0.76 (110) | 0.55 (80) | 0.83 (120) |

TABLE I-continued

Comparison of Various Facepiece Rubbers

| Elastomer<br>DREO Ident. | NR<br>FP390 | CIIR<br>FP321 | BIIR<br>FP398A |
|---|---|---|---|
| 300% Modulus MPa (psi) | 2.4 (350) | 3.1 (450) | 5.0 (720) |
| 500% Modulus MPa (psi) | 7.9 (1150) | 9.3 (1350) | 11.5 (1660) |
| Tensile Strength Mpa (psi) | 20.0 (2900) | 15.2 (2200) | 12.8 (1850) |
| Elong. @ Break % | 680 | 700 | 540 |
| Tear Strength kN/m (lb/in) | 38.7 (200) | 42.2 (240) | 28.2 (160) |
| Perm. Set % @ Elong. | 6.0 @ 500% | 5.0 @ 500% | 5.3 @ 500% |
| Cold Bending °C. | −26 | −21 | −26 |
| H Penetration μg @ 24 h | 935 | 0 | 0 |

NR - Natural Rubber
CIIR - Chlorobutyl Rubber
BIIR - Bromobutyl Rubber

The specific compositions of the formulations tabulated in Table I are listed in the following examples:

| | pph |
|---|---|
| Example 1 (FP321) | |
| Butyl HT 1066 (chlorobutyl) | 100.00 |
| Stearic acid | 1.00 |
| Zinc oxide | 5.00 |
| Dioctylphthalate (DOP) | 10.00 |
| Micronex ® Black S-301 } carbon black | 20.00 |
| Pelletex ® SRF N-770 | 25.00 |
| Naugawhite ® powder (alkylated phenol antioxdant) | 2.00 |
| Ethyl Zimate (accelerator) | 1.50 |
| | 164.50 |
| Example 2 (FP 398A) | |
| Bromobutyl rubber (Polysar ® x2) | 100.00 |
| Stearic acid | 1.00 |
| Zinc Oxide | 5.00 |
| N-326 (Regal ® 300) | 45.00 |
| Dibutylphthalate | 15.00 |
| Naugawhite powder | 2.00 |
| Ethyl zimate | 1.50 |
| | 169.50 |
| Example 3 (FP390) | |
| SMR-SL (natural rubber) | 100.00 |
| N-330 | 2.00 |
| Hi-Sil ® 230 (siliceous filler) | 24.00 |
| Zinc Oxide | 5.00 |
| Octoate ® Z | 2.00 |
| Polyethyleneglycol | 1.00 |
| Santocure ® NS | 1.00 |
| Vocol ® S | 1.60 |
| Flectol ® H | 2.00 |
| Paraffin wax | 2.00 |
| Sulphur (Vulcanizer) | 0.80 |
| | 141.40 |

In order to increase resiliency and cure rate, blends of bromobutyl rubber with 25 to 50 parts by weight of natural rubber were formulated. It will be noted from Table II below that improvements in resilience are evident and increases with the amount of natural rubber included. However, the CW-agent resistance and stress-cracking resistance are degraded. It is noteworthy that the useful upper limit of natural rubber inclusion appears to be about 35 parts by weight.

TABLE II

Blends of Bromobutyl Rubbers with Natural Rubber

| Elastomers | Bromobutyl/NR | | | |
|---|---|---|---|---|
| Blend Ratio | 75/25 | 70/30 | 65/35 | 50/5 |
| DREO Compound | FP363 | FP364 | FP365 | FP358 |
| Hardness Shore A₂ | 41 | 41 | 34 | 36 |
| 100% Modulus MPa (psi) | 0.97 (140) | 0.90 (140) | 0.90 (130) | .076 (110) |
| 300% Modulus MPa (psi) | 2.6 (380) | 2.5 (360) | 2.2 (320) | 1.7 (250) |
| 500% Modulus MPa (psi) | 5.0 (720) | 4.9 (710) | 4.4 (640) | 3.7 (540) |
| Tensile Strength MPa (psi) | 6.9 (1000) | 7.6 (1100) | 10.0 (1450) | 11.2 (1630) |
| Elong. @ Break % | 590 | 610 | 700 | 740 |
| Tear Strength kN/m (lb/in) | 28.2 (160) | 28.2 (160) | 28.2 (160) | 24.6 (140) |
| Perm Set. % @ 300% | 6.0 | 4.0 | 4.0 | 2.0 |
| Cold Bending °C. | −33 | — | — | — |
| H Penetration μg @ 24 h | 0 | 0 | 0 | 170 |

The specific compositions of the formulations tabulated in Table II are listed in the following examples:

| | pph |
|---|---|
| Example 4 (FP 363) | |
| Bromobutyl rubber | 75.00 |
| #1 RSS (natural rubber) | 25.00 |
| Agerite ® white (antioxidant) | 1.00 |
| P33 ® (carbon black) | 40.00 |
| Circo Light Oil (plasticizer) | 10.00 |
| Stearic acid | 1.00 |
| Sunproof ® Imp. (wax) | 1.50 |
| Zinc oxide | 5.00 |
| Mercaptobenzothiazole (accelerator) | 1.50 |
| Amberol ® ST 137 (curing agent) | 2.00 |
| Suplhur | 2.00 |
| | 164.00 |
| Example 5 (FP 364) | |
| Bromobutyl rubber | 70.00 |
| #1 RSS (natural rubber) | 30.00 |
| Agerite ® white (antioxidant) | 1.00 |
| P33 ® (carbon black) | 40.00 |
| Circo Light Oil (plasticizer) | 10.00 |
| Stearic acid | 1.00 |
| Sunproof ® Imp. (wax) | 1.50 |
| Zinc oxide | 5.00 |
| MBT | 1.50 |
| Amberol ® ST 137 | 2.00 |
| Sulphur | 2.00 |
| | 164.00 |
| Example 6 (FP 365) | |
| Bromobutyl rubber | 65.00 |
| #1 RSS (natural rubber) | 35.00 |
| Agerite ® white | 1.00 |
| P33 ® | 40.00 |
| Circo Light Oil | 10.00 |
| Stearic acid | 1.00 |
| Sunproof ® Imp. | 1.50 |
| Zinc oxide | 5.00 |
| MBT | 1.50 |
| Amberol ® ST 137 | 2.00 |
| Sulphur | 2.00 |

| | pph |
|---|---|
| | 164.00 |
| Example 7 (FP 358) | |
| Bromobutyl rubber (Polysar ®) | 50.00 |
| #1 Smoked Sheet (natural rubber) | 50.00 |
| Agerite ® white | 1.00 |
| P33 ® | 30.00 |
| Circo Light Oil | 10.00 |
| Stearic Acid | 1.00 |
| Sunproof ® Imp. | 1.50 |
| Zinc oxide | 5.00 |
| MBT | 1.50 |
| Amberol ® ST 137 | 2.00 |
| Sulphur | 2.00 |
| | 154.00 |

Dilutions of bromobutyl rubber with smaller amounts of natural rubber are illustrated in Table III below. These results establish a useful lower limit of 5 parts by weight of natural rubber in such formulations.

TABLE III
Small Additions of Natural Rubber to Bromobutyl Compound

| Elastomer DREO Indent. | BIIR FP438 | BIIR + 5 phr NR FP438A | BIIR + 10 phr NR FP438B | BIIR + 15 phr NR FP438C | BIIR + 20 phr NR FP438D | NR FP390 |
|---|---|---|---|---|---|---|
| Hardness Shore $A_2$ | 46 | 47 | 51 | 52 | 52 | 38 |
| 100% Modulus MPa (psi) | 0.72 (105) | 0.90 (130) | 0.86 (125) | 0.76 (110) | 0.72 (105) | 0.76 (110) |
| 300% Modulus MPa (psi) | 4.3 (620) | 4.9 (715) | 4.6 (660) | 3.9 (520) | 3.6 (520) | 2.4 (350) |
| 500% Modulus MPa (psi) | 8.6 (1245) | 8.7 (1260) | 8.0 (1155) | 7.4 (1070) | 6.5 (950) | 7.9 (1150) |
| Tensile Strength MPa (psi) | 11.5 (1670) | 11.0 (1600) | 10.9 (1575) | 9.6 (1395) | 8.5 (1230) | 20.0 (2900) |
| Elong. @ Break % | 675 | 660 | 700 | 660 | 660 | 680 |
| Tear Strength kN/m (lb/in) | 36.1 (205) | 36.1 (205) | 35.2 (200) | 32.6 (185) | 24.6 (140) | 38.7 (220) |
| Perm Set % @ Elong. | 10.5 @ 600% | 10.6 @ 600% | 12.4 @ 600% | 17.7 @ 600% | 19.2 @ 600% | 6.0 @ 500% |
| Cold Bending °C. | −26 | −27 | −26 | −26 | −27.5 | −26 |
| Ozone h to first crack | >24 | >24 | >24 | >24 | >24 | 0.5 |
| H Penetration μg @ 24 h | 0 | 0 | 0 | 0 | 0 | 935 |

The specific compositions of the formulation tabulated in Table III are listed in the following examples:

| | pph |
|---|---|
| Example 8 (FP 438) | |
| Polysar ® x2 (bromobutyl rubber) | 100.00 |
| Carbon black (N-550) | 50.00 |
| Stearic acid | 1.00 |
| Paraflex ® HT320 (plasticizer) | 5.00 |
| Dibutylsebacate (DBS) (plasticizer) | 10.00 |
| Sunproof ® Can. | 1.00 |
| Nickel dibutyldithiocarbamate (NBC) antioxidant | 0.75 |
| Zinc oxide | 5.00 |
| Methazate ® (zinc dimethydithiocarbamate) accelerator | 0.75 |
| Maglite ® D (light magnesium oxide) cure retarder | 0.35 |
| | 173.85 |
| Example 9 (FP 438A) | |
| Polysar ® x2 | 95.00 |
| SMR-5 (natural rubber) | 5.00 |
| N-550 | 50.00 |
| Stearc acid | 1.00 |
| Paraflex ® HT320 | 5.00 |
| DBS | 10.00 |
| Sunproof ® Can. | 1.00 |
| NBC | 0.75 |
| Zinc oxide | 5.00 |
| Methazate ® | 0.75 |
| Maglite ® D | 0.35 |
| | 173.85 |
| Example 10 (FP 438B) | |
| Polysar ® x2 | 90.00 |
| SMR-5 | 10.00 |
| N-550 | 50.00 |
| Stearic acid | 1.00 |
| Paraflex ® HT320 | 5.00 |
| DBS | 10.00 |
| Sunproof ® Can. | 1.00 |
| DBC | 0.75 |
| Zinc oxide | 5.00 |
| Methazate ® | 0.75 |
| Maglite ® D | 0.35 |
| | 173.85 |
| Example 11 (FP438C) | |
| Polysar ® x2 | 85.00 |
| SMR-5 | 15.00 |
| N-550 | 50.00 |
| Stearic acid | 1.00 |
| Paraflex ® HT320 | 5.00 |
| DBS | 10.00 |
| Sunproof ® Can. | 1.00 |
| NBC | 0.75 |
| Zinc oxide | 5.00 |
| Methazate ® | 0.75 |
| Maglite ® D | 0.35 |
| | 173.85 |
| Example 12 (FP438D) | |
| Polysar ® x2 | 80.00 |
| SMR-5 | 20.00 |
| N-550 | 50.00 |
| Stearic acid | 1.00 |
| Paraflex ® HT320 | 5.00 |
| DBS | 10.00 |
| Sunproof ® Can. | 1.00 |
| NBC | 0.75 |
| Zinc oxide | 5.00 |
| Methazate ® | 0.75 |
| Maglite ® D | 0.35 |
| | 173.85 |

Since bromobutyl rubbers have been found to exhibit faster cure rates than the other formulations, an effort to enhance the cure rates was thus undertaken. The results are outlined in Table IV below.

TABLE IV
Injection Mouldable Bromobutyl Rubbers

| Property | FP425 | FP425A | FP427 | FP428 |
|---|---|---|---|---|
| Hardness Shore $A_2$ | 51 | 52 | 50 | 45 |
| 100% Modulus MPa (psi) | 1.0 (150) | 1.5 (215) | 1.1 (165) | 1.2 (180) |
| 300% Modulus MPa (psi) | 6.1 (880) | 8.1 (1170) | 6.9 (995) | 7.5 (1080) |
| 500% Modulus MPa (psi) | 11.7 (1700) | — | 11.6 (1690) | — |

TABLE IV-continued

| | Injection Mouldable Bromobutyl Rubbers | | | |
|---|---|---|---|---|
| Property | FP425 | FP425A | FP427 | FP428 |
| Tensile Strength MPa(psi) | 12.7 (1840) | 12.0 (1740) | 2.6 (1820) | 12.2 (1775) |
| Elong & Break | 510 | 460 | 540 | 480 |
| Tear Strength kN/m (lb/in) | 40.0 (227) | 35.7 (203) | 37.5 (213) | 37.8 (215) |
| Perm. Set % @ 300% | 3.0 | 4.0 | 2.5 | 2.5 |
| Cold Bending °C. | −22 | −18 | −18 | −18 |
| $T_2$ min | 3.5 | 4.0 | 2.0 | 2.7 |
| $T_{90}$ min | 10.3 | 11.3 | 5.7 | 7.5 |
| H Penetration μg @ 24 h | 0 | 0 | 0 | 0 |

Monsanto Rheograph
$T_2$ - Time for 2 lb-in rise above minimum viscosity.
$T_{90}$ - Time to reach 90% if full cure.

The specific compositions of the formulations tabulated in Table IV are listed in the following examples.

| | pph |
|---|---|
| Example 13 (FP 425) | |
| BIIR (bromobutyl rubber) | 100.00 |
| N-550 | 50.00 |
| Paraflex ® HT320 | 10.00 |
| NBC | 1.50 |
| Sunproof ® Can. | 0.75 |
| Zinc oxide | 3.00 |
| Methazate ® | 0.50 |
| Maglite ® D | 0.35 |
| | 166.10 |
| Example 14 (FP 425A) | |
| BIIR | 100.00 |
| N-550 | 50.00 |
| Paraflex ® HT320 | 10.00 |
| Naugawhite ® powder | 2.00 |
| Sunproof ® Can. | 0.75 |
| Zinc oxide | 3.00 |
| Methazate ® | 0.50 |
| | 166.25 |
| Example 15 (FP 427) | |
| Polysar ® x2 | 100.00 |
| N-550 | 50.00 |
| Paraflex ® HT320 | 5.00 |
| Dicapryl phthalate | 7.50 |
| NBC | 1.50 |
| Octoate ® Z (fatty acid cure promoter) | 0.50 |
| Sunproof ® Can. | 1.00 |
| Zinc oxide | 3.00 |
| Methazate ® | 0.75 |
| | 169.25 |
| Example 16 (FP 428) | |
| Polysar ® x2 | 100.00 |
| N-550 | 50.00 |
| Paraflex ® HT320 | 5.00 |
| Dioctylazelate (DOZ) | 7.50 |
| NBC | 1.50 |
| Sunproof ® Can. | 1.00 |
| Zinc oxide | 3.00 |
| Methazate ® | 0.75 |
| Maglite ® D | 0.35 |
| | 169.10 |

With the apparent success in achieving fast cure times using the vulcanization systems shown in Table IV it was decided to produce facepieces on factory equipment. Compound (FP 428A) was processed on an Eckert & Ziepher, three-stage, injection moulding machine. A total of 125 facepieces were made. The conditions that were used were as follows:

| Injection Pressure | 13.8 MPa (2000 psi) |
|---|---|
| Injection Speed | #5 |
| Follow-up Pressure | 2.8 MPa (400 psi) |
| Follow-up Time | 15 sec |
| Unit Forward Pressure | 3.5 MPa (500 psi) |
| Top Forward Temperature | 163° C. (325° F.) |
| Bottom Plate Temperature | 171° C. (340° F.) |
| Core Temperature | 163° C. (325° F.) |
| Barrel Temperature | 60.0° C. (140° F.) |
| Screw Temperature | 60.0° C. (140° F.) |
| Cure Time | 3 min |

An optimum cure time of 3 min was arrived at by running 7 cures at 4, 3½, 3, 2½, 2, 1¾ and 1½ min at 171° C. (340° F.) and evaluating the tension properties of the moulded facepiece.

The bromobutyl rubber product made from this trial was a very acceptable facepiece. After assembly into C3 masks the final product gave a comfortable, easy fitting mask that looked very favourable.

From these physical properties it was felt that two areas could be improved, namely the low temperature flexibility and the tensile strength, although not poor should be increased. As for the tensile strength it was felt that adjustments in the carbon black loading of the composition from a low structure black to one of a higher structure, one with different particle sizes, i.e. a mixed particle size distribution, would bring up the tensile strength to about 2000 psi (14 MPa). One other change was contemplated at this time and that was in the amount of antioxidant. Although not seen on laboratory mixed rubber, a yellow bloom was noticed on the surface of the facepiece after storage. As a bloom is produced by a product being insoluble in a cured vulcanizate at the level used, it was though a slight reduction of the NBC (Nickel dibutyl dithiocarbamate) antioxidant in the compound would suffice.

These above changes were brought together in a new formulation where physical properties are shown in Table V below.

TABLE V

| Effect of Increased Carbon Black Structure and Reduced NBC Level in Bromobutyl Rubber | |
|---|---|
| Hardness Shore $A_2$ | 52 |
| 100% Modulus MPa (psi) | 1.5 (214) |
| 300% Modulus MPa (psi) | 8.5 (1231) |
| 500% Modulus MPa (psi) | — |
| Tensile Strengh MPa (psi) | 12.1 (1759) |
| Elong. @ Break % | 400 |
| Tear Strength kN/m (lb/in) | 35.4 (201) |
| Perm. Set % @ 300% | 2.5 |
| Cold Bending °C. | −26 |
| Bloom @ 4 months | Slight |
| H-penetration μg @ 24 h | 0 |

The composition of the Table V formulation is (FP 435).

Five additional compositions including levels 0, 0.5, 0.75, 1.00 and 1.50 pph of NBC were mixed and cured. These were then evaluated for bloom formation, physical properties, ozone and weathering tests and cold bending properties. The results of these tests are shown in Table VI below. These results indicate that a level of about 0.5 pph of NBC is the optimum.

TABLE VI

Effect of NBC in Bromobutyl Rubber

| NBC* (pph) | 0 | 0.50 | 0.75 | 1.00 | 1.50 |
|---|---|---|---|---|---|
| DREO Compound | FP436A | FP436B | FP436C | FP436D | FP436E |
| Hardness Shore $A_2$ | 59 | 52 | 52 | 52 | 52 |
| 100% Modulus MPa (psi) | 1.4 (197) | 1.5 (216) | 1.6 (228) | 1.4 (209) | 1.3 (194) |
| 300% Modulus MPa (psi) | 7.7 (1109) | 8.0 (1163) | 8.1 (1179) | 8.1 (1175) | 7.5 (1081) |
| 500% Modulus MPa (psi) | — | — | — | — | — |
| Tensile Strength MPa (psi) | 11.7 (1701) | 11.7 (1701) | 12.0 (1734) | 12.1 (1756) | 12.2 (1751) |
| Elong. @ Break % | 440 | 420 | 420 | 430 | 460 |
| Tear Strength kN/m (lb/in) | 34.7 (197) | 36.8 (209) | 39.1 (222) | 34.1 (194) | 34.7 (197) |
| Perm. Set % @ 300% | 3.2 | 3.1 | 3.2 | 3.1 | 3.2 |
| Cold Bending °C. | −16 | −17 | −18 | −17 | −15 |
| Bloom @ 2 months | None | None | Slight | Med. | Slight |
| Oxone h to crack | >24 | >24 | >24 | >24 | >24 |
| H-penetration μg @ 24 h | 0 | 0 | 0 | 0 | 0 |

*NBC - Nickel dibutyl dithiocarbamate

The specific compositions of the formulation listed in Table VI are provided in the following examples.

| | pph |
|---|---|
| Example 17 (FP 436A) | |
| Bromobutyl (Polysar ®) x2 | 100.00 |
| N-550 (Sterling ® S0) } carbon black | 40.00 |
| N-220 (Vulcan ® 6) | 10.00 |
| Paraflex ® HT320 | 5.00 |
| Kodaflex ® TX1B ester plasticizer | 9.50 |
| NBC | 0. |
| Sunproof ® Canadian | 1.00 |
| Methazate ® | 0.75 |
| Maglite ® D | 0.35 |
| Zinc oxide | 3.00 |
| | 3.00 |
| | 169.60 |
| Example 18 (FP 436B) | |
| Bromobutyl (Polysar ® x2) | 100.00 |
| N-550 | 40.00 |
| N-220 | 10.00 |
| Paraflex ® HT320 | 5.00 |
| Kodaflex ® TX1B | 9.50 |
| NBC | 0.50 |
| Sunproof ® Canadian | 1.00 |
| Maglite ® D | 0.35 |
| Zinc oxide | 3.00 |
| Methazate ® | 0.75 |
| | 170.10 |
| Example 19 (FP 436C) | |
| Bromobutyl (Polysar ® x2) | 100.00 |
| N-550 | 40.00 |
| N-220 | 10.00 |
| Paraflex ® HT320 | 5.00 |
| Kodaflex ® TX1B | 9.50 |
| NBC | 0.75 |
| Sunproof ® Canadian | 1.00 |
| Maglite ® D | 0.35 |
| Zinc oxide | 3.00 |
| Methazate ® | 0.75 |
| | 170.35 |
| Example 20 (FP 436D) | |
| Polysar ® x2 | 100.00 |
| N-550 | 40.00 |
| N-220 | 10.00 |
| Paraflex ® HT320 | 5.00 |
| Kodaflex ® TX1B | 9.50 |
| NBC | 1.00 |
| Sunproof ® Canadian | 1.00 |
| Maglite ® D | 0.35 |
| Zinc oxide | 3.00 |
| Methazate ® | 0.75 |
| | 170.60 |
| Example 21 (FP 436E) | |
| Polysar ® x2 | 100.00 |
| N-550 | 40.00 |
| N-220 | 10.00 |
| Paraflex ® HT320 | 5.00 |
| Kodaflex ® TX1B | 9.50 |
| NBC | 1.50 |
| Sunproof ® Canadian | 1.00 |
| Maglite ® D | 0.35 |
| Zinc oxide | 3.00 |
| Methazate ® | 0.75 |
| | 171.10 |

Low temperature flexibility properties were measured by a cold bending test which measures the load required to bend a 1" wide sample strip of rubber around a steel mandrel through 170° at the radius of curvature of the mandrel. An arbitrary stiffening temperature is considered to be that at which the load has increased by 50% of the load at 20° C. This gives a more realistic low temperature flexibility result than a freeze or brittle point of an elastomer.

Tests of various bromobutyl rubbers showed some variations in the compositions evaluated and it was established that a small amount of low temperature plasticizer is required to give flexibilities comparable to that of natural rubber. This shows as a cold bending result in the area of −25° C. The amount of ester-type plasticizer must be kept to a minimum, as processing problems arise during injection moulding of these compounds at high curing temperatures. A level of 10 parts per hundred of rubber appears to be the maximum for most ester plasticizers.

The long-term storage of bromobutyl rubber facepieces at low temperatures had little or no added effect whereas a natural rubber facepiece began to show the effect of polymer crystallization after 2 to 3 says of cold soaking. This crystallization could have serious consequences in the colder regions of the world.

The low temperature flexibility results shown by Tables V, VI and VII (below) indicate that −25° C. is about the best result that can be achieved.

The comparison in Table VII (below) of three ester-type plasticizers showed little difference but all gave good low temperature flexibility results. These rubbers were also exposed to −30° C. in the cold test chamber at DREO for the period of a week with a natural rubber control. The natural rubber moulding had crystallized into a brittle product whereas the bromobutyl rubber facepiece mouldings were still flexible although showing signs of some stiffening.

TABLE VII
Effect of Various Low Temperature Plasticizers in Bromobutyl Rubber

| Low Temperature Plasticizer DREO Compound | Kodaflex TX-IB FP437 | Dicapryl Phthalate FP437A | Dibutyl Sebacate FP437B |
|---|---|---|---|
| Hardness Shore A$_2$ | 47 | 47 | 48 |
| 100% Modulus MPa (psi) | 1.0 (149) | 1.0 (148) | 0.94 (136) |
| 300% Modulus MPa (psi) | 5.6 (810) | 5.8 (847) | 6.0 (863) |
| 500% Modulus MPa (psi) | 10.7 (1554) | 10.7 (1545) | 11.0 (1599) |
| Tensile Strength MPa (psi) | 11.8 (1707) | 12.0 (1734) | 11.8 (1707) |
| Elong. @ Break % | 550 | 570 | 540 |
| Tear Strength kN/m (lb/in) | 37.5 (206) | 37.5 (213) | 34.5 (198) |
| Perm. Set % @ 300% | 2.0 | 2.2 | 2.3 |
| Cold Bending °C. | −25 | −26 | −27 |
| H-penetration μg @ 24 h | 0 | 0 | 0 |

The specific compositions of the formulations listed in Table VII are provided in the following examples.

| | pph |
|---|---|
| Example 22 (FP 437) | |
| Polysar ® x2 | 100.00 |
| N-550 | 50.00 |
| Paraflex ® HT320 | 5.00 |
| Kodaflex ® TX1B | 9.50 |
| Sunproof ® Can. | 1.00 |
| NBC | 0.75 |
| Zinc oxide | 3.00 |
| Methazate ® | 0.75 |
| Maglite ® D | 0.35 |
| | 170.35 |
| Example 23 (FP 437A) | |
| Polysar ® x2 | 100.00 |
| N-550 | 50.00 |
| Paraflex ® HT320 | 5.00 |
| Dicapryl phthalate | 9.50 |
| Sunproof ® Can. | 1.00 |
| NBC | 0.75 |
| Zinc oxide | 3.00 |
| Methazate ® | 0.75 |
| Maglite ® D | 0.35 |
| | 170.35 |
| Example 24 (FP 437B) | |
| Polysar ® x2 | 100.00 |
| N-550 | 50.00 |
| Paraflex ® HT320 | 5.00 |
| Dibutylseburate | 9.50 |
| Sunproof ® Can. | 1.00 |
| NBC | 0.75 |
| Zinc oxide | 3.00 |

| | pph |
|---|---|
| Methazate ® | 0.75 |
| Maglite ® D | 0.35 |
| | 170.35 |

Applicants' then turned their attention to further improvements in both tensile and tear strength while retaining low-temperature flexibility.

The results are outlined in Table VIII below.

TABLE VIII

| DREO Compound | FP439B | FP443 | FP444 | FP446 | FP443F |
|---|---|---|---|---|---|
| Hardness Shore A$_2$ | 50 | 51 | 49 | 47 | 43 |
| 100% Modulus (psi) | 132 | 182 | 112 | 149 | 121 |
| 300% Modulus (psi) | 728 | 902 | 533 | 585 | 632 |
| 500% Modulus (psi) | 1332 | 1519 | 1218 | 907* | 1276 |
| Tensile Strength (psi) | 1663 | 1646 | 1342 | 1128 | 1667 |
| Elong. @ Break % | 690 | 670 | 550 | 480 | 650 |
| Tear Strength (lb/in) | 215 | 229 | 184 | 173 | 189 |
| Perm. Set % @ 500% | 10.8** | 9 | 15.3 | 12.1* | 7.6 |
| Cold Bending °C. | −22 | −28 | −28 | −33 | −28 |
| H-penetration μg @ 24 h | 0 | 0 | 0 | 0 | 0 |

*400%
**600%

The specific compositions outlined in Table VIII are described in the following examples.

| | pph |
|---|---|
| Example 25 (FP 439B) | |
| Bromobutyl rubber (Polysar ® x2) | 100.00 |
| N-550 (Sterling ® S0) | 50.00 |
| Stearic acid | 1.00 |
| Paraflex ® HT320 | 5.00 |
| DBS | 10.00 |
| Sunproof ® Can. | 1.00 |
| NBC | 0.50 |
| Zinc oxide | 5.00 |
| Methazate ® | 0.75 |
| Maglite ® D | 0.35 |
| | 173.60 |
| Example 26 (FP 443) | |
| Bromobutyl (Polysar ® x2) | 100.00 |
| N-550 (Sterling ® S0) | 50.00 |
| Stearic acid | 1.00 |
| Paraflex ® HT320 | 5.00 |
| DBS | 10.00 |
| Sunproof ® Can. | 1.00 |
| NBC | 0.50 |
| Zinc Oxide | 3.00 |
| Methazate ® | 0.25 |
| | 170.75 |
| Example 27 (FP 444) | |
| Bromobutyl (Polysar ® x2) | 100.00 |
| N-220 (Vulcan ® 6) | 35.00 |

-continued

|  | pph |
|---|---|
| Stearic acid | 1.00 |
| Paraflex ® HT320 | 5.00 |
| DBS | 10.00 |
| Sunproof ® Can. | 1.00 |
| NBC | 0.50 |
| Zinc Oxide | 3.00 |
| Methazate ® | 0.25 |
|  | 155.75 |
| Example 28 (FP 446) |  |
| Bromobutyl rubber (Polysar ® x2) | 100.00 |
| N-326 (Regal ® 300) | 55.00 |
| Stearic acid | 1.00 |
| Paraflex ® HT320 | 5.00 |
| DBS | 10.00 |
| Sunproof ® Can. | 1.00 |
| NBC | 0.50 |
| Zinc Oxide | 5.00 |
| Methazate ® | 0.25 |
|  | 177.75 |
| Example 29 (FP 443F) |  |
| Bromobutyl rubber (Polysar ® x2) | 100.00 |
| N-550 | 50.00 |
| Stearic acid | 1.00 |
| Paraflex ® HT32 | 5.00 |
| DBS | 10.00 |
| Sunproof ® Can. | 0.75 |
| NBC | 0.50 |
| Zinc Oxide | 3.00 |
| Methazate ® | 0.25 |
|  | 170.50 |

It is apparent from Table VIII that formulations (FP 439B) and (FP 443) exhibit the greatest tensile strength properties. However, (FP 443) is considered the preferred formulation on the basis of high tear strength.

All of the bromobutyl rubber formulations were processed according to the following schedule.

| Time (minutes) |  |
|---|---|
| 0 | Add bromobutyl rubber; |
| 2 | Add half of the carbon black, stearic acid, antioxidant and wax; |
| 4 | Add other half of carbon black, paraffinic plasticizer and the ester plasticizer |
| 6 | Clean down; |
| 7 | Dump. |

Add zinc oxide to the rubber accelerator on cool mill.
Privilige is claimed are defined as follow:

1. A non-dermatitic, injection mouldable, low-temperature flexible synthetic rubber composition which provides twenty-four hour protection from penetration by H-agent, consisting of:
   100: bromobutyl rubber
   50: carbon black
   1: a fatty acid cure promoter
   5: a paraffinic plasticizer
   10: a low-temperature plasticizer selected from the group consisting of dibutylsebacate and dicapryl phthalate
   0.5: nickel dibutyldithiocarbamate as an antioxidant
   1: a microcrystalline wax
   0.25–0.75: zinc dimethyldithiocarbamate as a rubber accelerator
   3–5: a metal oxide curing agent, and
   0–0.35: magnesium oxide as a cure retarder,
wherein the proportions are expressed as parts by weight per one hundred parts of bromobutyl rubber.

2. A synthetic rubber composition according to claim 1, wherein the carbon black includes a mixture of particle sizes.

3. An injection mouldable synthetic rubber composition, which provides twenty-four hour protection from penetration by H-agent, consisting essentially of:

| bromobutyl rubber | 100.00 |
|---|---|
| carbon black (N-550) | 50.00 |
| stearic acid | 1.00 |
| paraffinic plasticizer | 5.00 |
| dibutylsebacate | 10.00 |
| microcrystalline wax | 1.00 |
| nickel dibutyldithiocarbamate | 0.50 |
| zinc oxide | 5.00 |
| zinc dimethyldithiocarbamate | 0.75 |
| magnesium oxide | 0.35 |
|  | 173.60 | wherein the proportions are expressed as parts by weight per one hundred parts of synthetic rubber.

4. An injection mouldable synthetic rubber composition which provides twenty-four hour protection from penetration by H-agent, consisting essentially of:

| bromobutyl rubber | 100.00 |
|---|---|
| carbon black (N-550) | 50.00 |
| stearic acid | 1.00 |
| paraffinic plasticizer | 5.00 |
| dibutylsebacate | 10.00 |
| microcrystalline wax | 1.00 |
| nickel dibutyldithiocarbamate | 0.50 |
| zinc oxide | 3.00 |
| zinc dimethyldithiocarbamate | 0.25 |
|  | 170.75 | wherein the proportions are expressed as parts by weight per one hundred parts of synthetic rubber.

* * * * *